(12) United States Patent
Eisbach et al.

(10) Patent No.: US 6,297,807 B1
(45) Date of Patent: Oct. 2, 2001

(54) MICROPHONE SHEATH HAVING POINTING DEVICE AND CONTROL BUTTONS

(75) Inventors: Christopher Eisbach, Mountain View; Edwin Joseph Selker, Palo Alto, both of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/127,668

(22) Filed: Jul. 31, 1998

(51) Int. Cl.[7] ........................................ G09G 5/08
(52) U.S. Cl. ........................ 345/163; 345/156; 381/122
(58) Field of Search ........................ 345/153–167, 345/172; 348/14–15; 381/122, 361, 365, 366; 340/706, 825.25; 235/472; 341/176

(56) References Cited

U.S. PATENT DOCUMENTS

| | | |
|---|---|---|
| 4,954,817 * | 9/1990 | Levine .................................. 340/706 |
| 5,033,077 | 7/1991 | Bergeron et al. ....................... 379/67 |
| 5,126,543 | 6/1992 | Bergeron et al. ..................... 235/462 |
| 5,453,759 * | 9/1995 | Seebach ................................ 345/158 |
| 5,598,162 * | 1/1997 | Terashima et al. ................... 341/176 |
| 5,602,380 * | 2/1997 | Bishay ................................. 235/472 |
| 5,631,669 * | 5/1997 | Stobbs et al. ........................ 345/163 |
| 5,648,760 * | 7/1997 | Kumar ............................. 340/825.25 |
| 5,659,335 * | 8/1997 | Partridge, III ....................... 345/157 |
| 5,706,031 * | 1/1998 | Brendzel et al. ..................... 345/172 |

* cited by examiner

*Primary Examiner*—Steven Saras
*Assistant Examiner*—Srilakshmi Kumar
(74) *Attorney, Agent, or Firm*—Robert Buckley

(57) ABSTRACT

A computer dictation device provides a slender microphone sheath into which a hand-held microphone is inserted. The sheath incorporates a miniature pointing device and control buttons, and provides a single electrical cable connection between the hand-held device and a computer system. The comfortable, light weight device can easily be operated with one hand because it makes the microphone and pointer controls accessible to the fingers and thumb of the microphone-holding hand.

24 Claims, 3 Drawing Sheets

MICROPHONE SHEATH HAVING POINTING DEVICE AND CONTROL BUTTONS

RELATED APPLICATION

This U.S. Patent Application is related to a co-pending U.S. Patent Application entitled "Low Noise Circuit Board for TrackPoint® Pointing Device," Ser. No. 09/052,805, filed Mar. 31, 1998. Both Patent Applications are assigned to the International Business Machines Corporation. (TrackPoint is a registered trademark of the International Business Machines Corporation.)

FIELD OF THE INVENTION

The invention generally relates to information processing systems, and more specifically to the use of computer systems for dictating reports by radiologists. The invention has a particular applicability to IBM® computers and computer systems. (IBM is a registered trademark of the International Business Machines Corporation.)

BACKGROUND OF THE INVENTION

A radiologist is a physician who specializes in the interpretation of radiographic images such as X-rays, CAT-scans and MRI images. When dictating notes related to his observations, the radiologist often sits or stands before a back-lighted viewing box describing what is seen in a particular group of radiographic images. The vocabulary used in the dictation is limited to such an extent that automatic computer translation of voice to text has been successfully applied in this activity. Radiologists who use such computer assisted systems have become accustomed to using specific hand-held microphones, which resemble the hand-held microphones used by entertainers. These microphones are slender and light weight and incorporate a thumb operated switch for turning the microphone on and off.

A number of manufactures have attempted to combine built-in microphones with computer pointing devices and in one device, a bar code scanner for reading the bar codes on the radiographic images in a single swipe of the hand holding the microphone. In general, these devices have met with only limited success, many radiologists preferring their familiar hand-held microphones.

A need exists to provide some way for the radiologist to use a familiar hand-held microphone while being able to control cursor positioning and object selection and activation using the microphone-holding hand.

SUMMARY OF THE INVENTION

This need, and others that will become apparent, is met by the present invention which provides a slender microphone sheath into which the radiologist's favorite hand-held microphone is inserted. The sheath incorporates a miniature pointing device and control buttons, and provides a single electrical cable connection between the hand-held device and a computer system. The comfortable, light weight device can easily be operated with one hand because it makes all the controls accessible to the fingers and thumb of the microphone-holding hand.

BRIEF DESCRIPTION OF THE DRAWINGS

For a further understanding of the objects, features and advantages of the present invention, reference should be had to the following description of the preferred embodiment, taken in conjunction with the accompanying drawing, in which like parts are given like reference numerals and wherein.

DESCRIPTION OF THE PREFERRED EMBODIMENT

Figure 1:
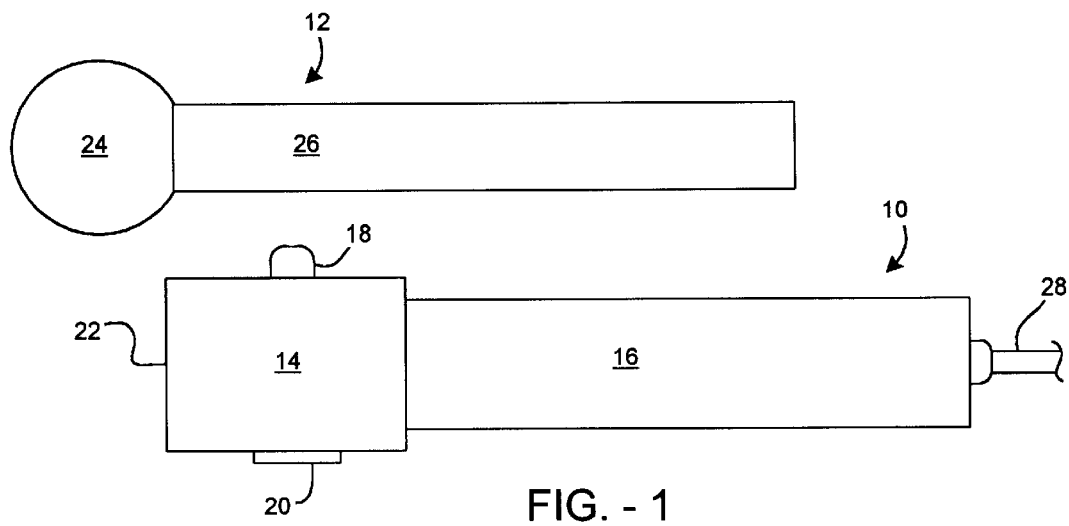
FIG. 1 is a side pictorial view illustrating a microphone sheath according to one aspect of the present invention and a microphone for use with the sheath.

With reference to FIG. 1 there is shown a microphone sheath having a pointing device and control button according to one aspect of the present invention and designated generally by the reference numeral 10. A microphone for use with the sheath is also shown, and is designated generally by the numeral 12. The microphone is not part of the invention, and is shown only to assist in understanding the various features and advantages of the invention.

The microphone sheath 10 includes a control portion 14 and an elongated body 16. The control portion 14 includes an isometric pointing device (not shown) having a pointing stick 18, and at least one control button 20 (one button is shown). The control portion 14 is open at one end 22, and the control portion 14 and the body 16 are hollow inside for receiving the microphone 12 via the open end 22. The microphone 12 includes a head 24, which is the speaking end, and an elongated body 26 which includes a manually operated switch (not shown) for turning the microphone on and off. The microphone sheath 10 also includes a cable 28 shown leaving the sheath body 16 at one end opposite the open end 22. The cable 28 includes wires for electrically connecting a microphone, the pointing device and the control button to a computer system or other electronic assembly.

In general, the microphone 12 is inserted into the microphone sheath 10 via the open end 22, and a user speaks into the microphone head 24 and operates the pointing stick 18 and the at least one control button 20 to dictate and to control a computer graphical user interface. The invention has particular application in the field of computer aided dictation and specifically for use by radiologists in using a computer to dictate notes related to radiographic images, such as X-rays, CAT scans, and MRI's.

Figure 2:
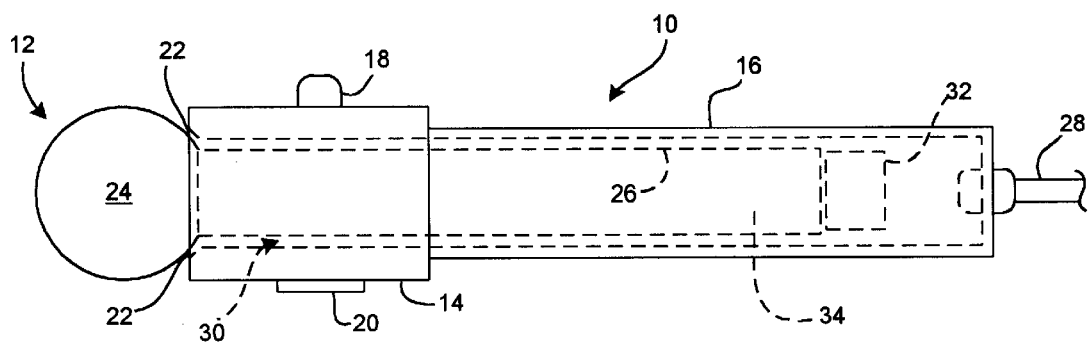
FIG. 2 is a side pictorial view illustrating the microphone inserted into the sheath.

FIG. 2 is a schematic diagram which illustrates the microphone 12 inserted into the microphone sheath 10 of FIG. 1. The microphone sheath 10 is hollow on the inside and defines a receiving space 30 into which the microphone 12 is inserted via the open end 22. The receiving space 30 includes a microphone connector 32 located near an end of the receiving space opposite the open end 22. When the microphone 12 is inserted via the open end 22 into the receiving space 30, the microphone body 16 is guided along interior walls of the microphone sheath 10 until one end 34 of the microphone engages the microphone connector 32. This engagement completes an electrical connection between the microphone 12 and the microphone sheath 10 via the microphone electrical connector 32. The microphone connector 32 is compatible with a mating connector (not shown) located at the end 34 of the microphone body.

When the microphone 12 is inserted into the microphone sheath 10, the combination of microphone and sheath provide a single unit having a diameter not much larger than the body 26 of the microphone 12. A user holds the body 16 of the sheath in one hand, operates the pointing stick 18 with the thumb of the same hand, and uses the index finger of the same hand to operate the at least one control button 20. The control button corresponds to the control button on a single button pointing device and to the left-control button on a two button pointing device. The cable 28 is of sufficient length to permit the user some degree of freedom to stand or move about without being confined to a single position while dictating. This freedom is useful for the radiologist who moves back and forth in front of a series of radiographic images on a wall mounted light box while dictating notes related to observations concerning the images.

The microphone sheath 10 permits the use of a familiar microphone 12 without changing the heft and feel of the microphone to such an extent that the user is uncomfortable, nor without changing the electrical and acoustic characteristics of the microphone to such an extent that computer aided translation is impaired. These factors provided the motivation that led to the making of this invention, since it would have been an obvious choice to incorporate a microphone element into a hand-held pointing device. The loyalty of the particular user group to which the invention is directed to a specific microphone necessitated the finding of a solution which permitted the popular microphone to be combined with a hand-held pointing device. The result is the present invention—a sheath for the preferred microphone that incorporates a pointing device, at least one control button and necessary cable and connectors.

Figure 3:
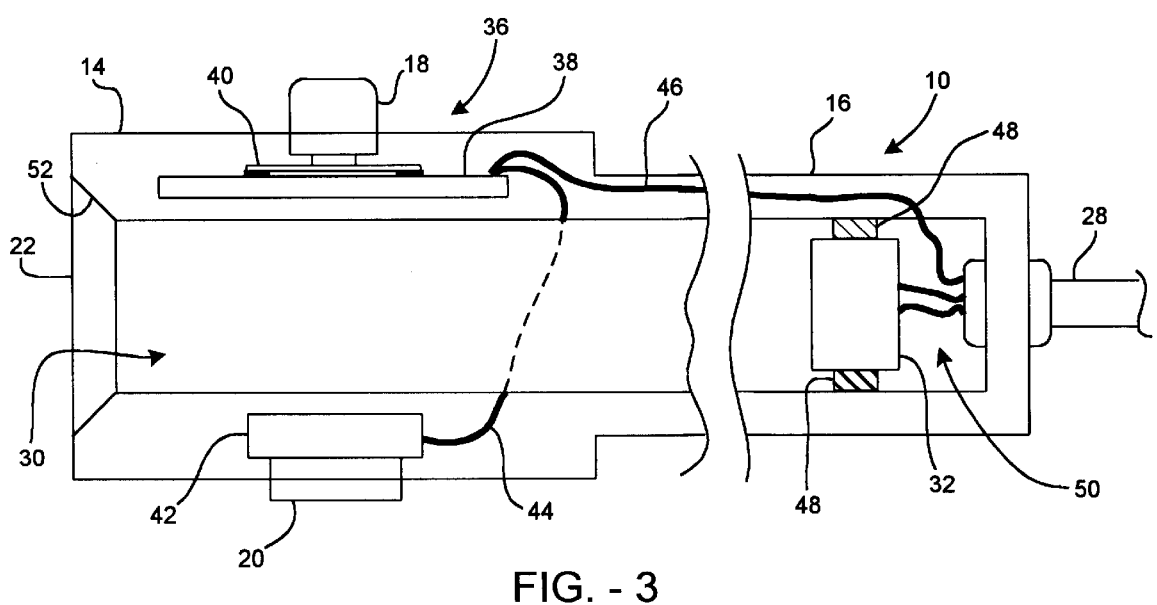
FIG. 3 is a cutaway view illustrating the major components of the microphone sheath of FIGS. 1 and 2.

FIG. 3 is a side cut-away view of the microphone sheath 10 of FIGS. 1 and 2. The sheath body 16 has been shortened so that the remainder of the sheath 10 can be enlarged to reveal additional details. The control portion 14 encloses an isometric pointing device, designated generally by the reference numeral 36. The pointing device 36 includes a small printed wiring board 38, a ceramic two-dimensional strain gauge 40 to which the control stick 18 is attached, and electronic circuitry (not shown) mounted on the printed wiring board 38 for processing signals derived from the strain gauge 40 and providing an industry standard mouse-type pointing signal compatible with the IBM PS/2® standard (PS/2 is a registered trademark of the International Business Machines Corporation). The pointing stick 18 extends through an opening in an outer surface of the control portion 14. The circuits on pointing device 36 receive operating power via some of the wires in the cable 28 from the computer system or other electronic assembly to which the microphone sheath 10 is attached.

The control portion 14 also includes at least one control button 20. The control button 20 is attached to a switch 42 which is in turn connected to the pointing device printed wiring board 38 via wires 44. The broken line used to complete the wires 44 indicates that the wires 44 pass through the walls of the control portion 14 and do not intrude into the receiving space 30. The pointing device 36 includes circuits which process the signals from the switch 42 and incorporate the control button signals into the industry standard pointing signal. An electrical connection is made between the cable 28 and the printed wiring board 38 via the wires 46.

The receiving space 30 is defined as the hollow interior of the sheath 10 extending from the opening 22 toward the cable end and ending at the microphone connector 32 which is shown attached to the interior walls of the sheath body 16 by support members 48. The microphone connector 32 is electrically attached to the cable 28 via wires 50. The leading edge of the open end 22 is beveled 52 to guide the microphone body 16 into the receiving space 30.

Figure 4:
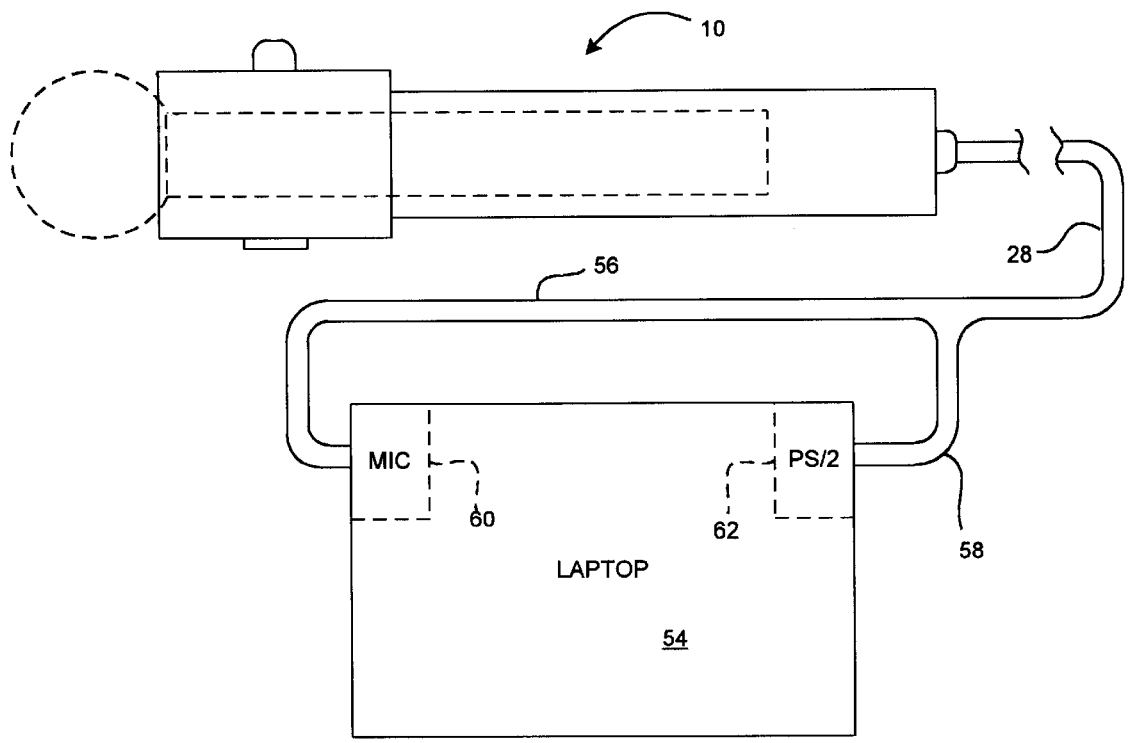
FIG. 4 is a schematic illustration of the microphone sheath connected to a laptop computer via a pair of connectors, one for the microphone, the other for a pointer and control button.

FIG. 4 is a pictorial diagram which illustrates a cable connection between the microphone sheath 10 and a laptop computer 54. A microphone is illustrated as a broken outline only since it is not part of the invention. The cable 28 splits into two cables 56, 58, each split cable having its own connector. The cable portion 56 includes a microphone jack 60 for attaching the cable 56 to a microphone receptacle on the laptop computer 54. The cable portion 58 includes a connector compatible with the PS/2 port of the laptop computer 54.

Figure 5:
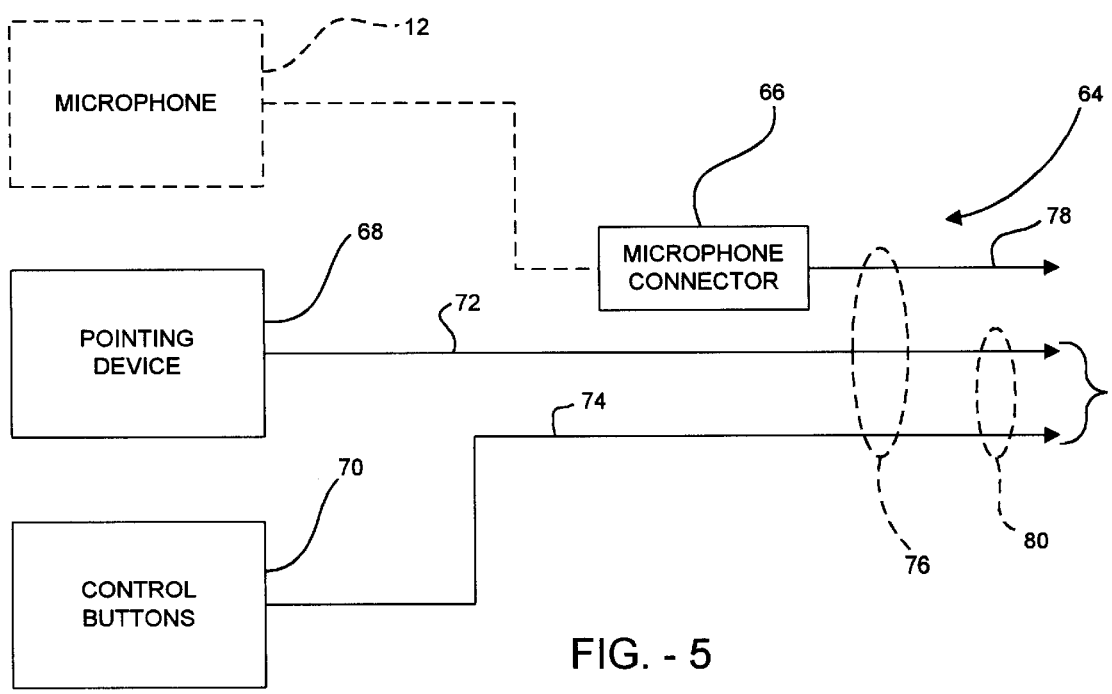
FIG. 5 is an electrical schematic diagram which illustrates electrical connections and an electrical cable having two connectors at a computer end.

FIG. 5 is an electrical schematic diagram illustrating a different specific embodiment of the microphone sheath with pointing device and control buttons, designated generally by the reference numeral 64. The sheath 64 includes a receiving space for a microphone 12 and provides a microphone connector for compatible electrical connection to the microphone. The sheath 64 also includes a pointing device 68 and at least one control button 70. In this embodiment, the at least one control button 70 and the pointing device 68 use separate wires 72, 74 within a cable assembly 76. The microphone connector is attached via wires 78 within the cable assembly 76. The cable assembly splits into two cables, one including the microphone wires 78, the other 80, including the pointing device wires 72 and the control button wires 74. The pointing device receives operating power via some of the wires 72 from the computer system or other electronic assembly to which it is attached.

Figure 8:
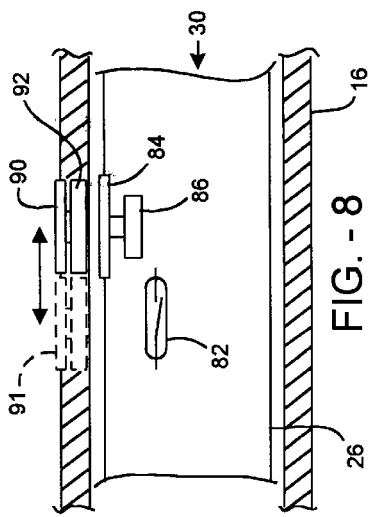
FIG. 8 is a cutaway side view of the microphone inserted into a sheath which includes a lever operated sliding magnet for operating the microphone reed switch.
Figure 7:
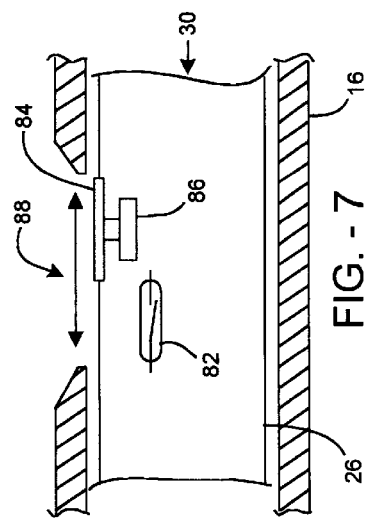
FIG. 7 is a cutaway side view of the microphone inserted into a sheath and illustrating an opening in the sheath for operating the microphone switch shown in FIG. 6.

In a specific embodiment of the invention, the microphone is a Sennheiser model MD431II which looks somewhat as illustrated in FIG. 1 and includes an internal magnetically operated reed switch for turning the microphone on and off. This feature is illustrated schematically in FIG. 6. FIGS. 7 and 8 illustrate schematically two embodiments of the invention, one (FIG. 7) provides an opening along one side of the sheath body permitting a user to directly operate the microphone switch. In another embodiment (FIG. 8) the invention incorporates a lever operated sliding magnet which permits the user to actuate the reed switch without moving the microphone switch, which remains in an off position.

Figure 6:
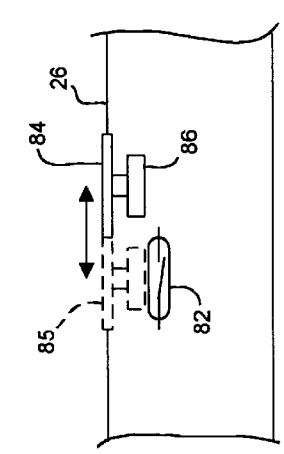
FIG. 6 is a cutaway side view of a portion of the microphone illustrating a magnetically operated reed switch for turning on and off the microphone.

FIG. 6 is a cutaway schematic side view of a portion of the microphone body 26 of FIG. 1. The microphone includes a magnetic reed switch 82, a sliding lever 84, and a magnet 86. The lever 84 and magnet 86 are shown in an 'off' position in which the reed switch contacts are open (as illustrated). When the lever 84 is slid to an 'on' position 85, the magnet is in close proximity to the reed switch 82 causing the switch contacts to close.

FIG. 7 is a side cutaway schematic view of the portion of the microphone body 26 illustrated in FIG. 6. The microphone is within the receiving space 30 defined by the surrounding sheath body, a portion of which 16 is shown cross-hatched. An opening 88 is provided in one side of the sheath body 16 permitting a user to operate the microphone switch by sliding the lever 84 and magnet 86 with respect to the reed switch 82. The lever 84 is shown in an 'off' position.

FIG. 8 is another side cutaway schematic view of the same portion of the microphone body 26 illustrated in FIGS. 6 and 7. The body portion 26 is within the receiving space 30 surrounded by the sheath body 16. The sliding lever 84, magnet 86 and reed switch 82 are as previously described. In this specific embodiment, the sheath body 16 includes a sliding lever 90 to which is attached a magnet 92. The lever 90 and magnet 92 do not intrude into the receiving space 30, but the magnet 92 is of sufficient field strength that when the lever 90 (shown in an 'off' position) is slid to an 'on' position 91, the magnet 92 causes the contacts of the reed switch 82 to close. It is necessary that the lever 84 of the microphone switch remain in its 'off' position so as not to override the effects of the magnet 92.

Figure 9:
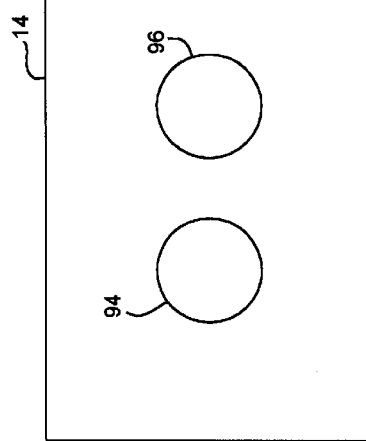
FIG. 9 is a partial bottom view of a control portion of the microphone sheath illustrating placement of a pair of control buttons and a microphone on/off switch.

FIG. 9 is a partial bottom schematic view of the control portion 14 and a portion of the body 16 of the microphone sheath. FIG. 9 illustrates a specific embodiment which includes two control buttons 94, 96 and a sliding lever 90 for turning on and off an inserted microphone. The two control buttons 94, 96 correspond to left- and right-pointing device control buttons. As with nearly all pointing device control buttons, the functions are interchangeable via use of portions of the graphical user interface of any computer system to which the microphone sheath is attached.

Figure 10:
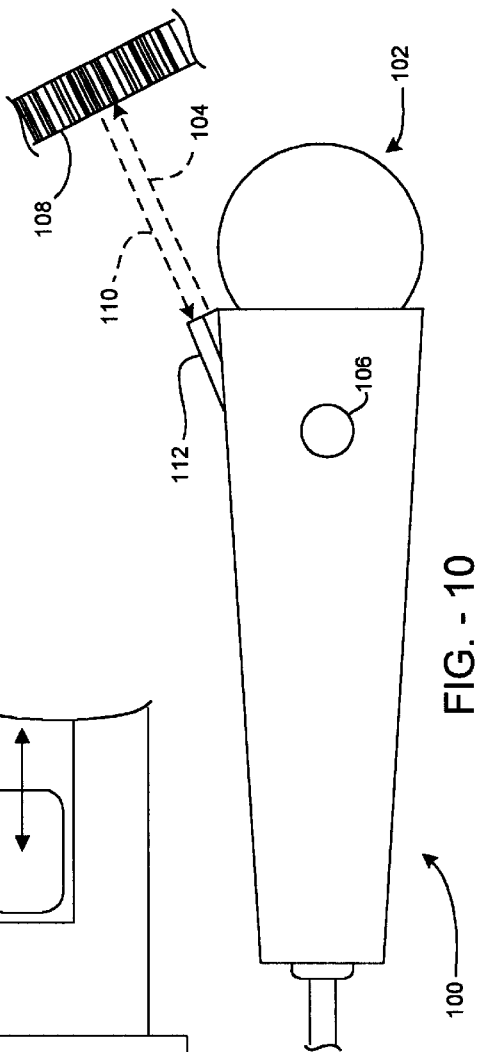
FIG. 10 is a side view illustrating a microphone sheath and pointing device having a laser pointer and bar code reader.

Finally, FIG. 10 is a side view which illustrates a computer input device according to another embodiment of the invention. The input device is designated generally by the reference numeral 100, and defines a microphone sheath for receiving a microphone 102 as previously discussed. The input device 100 includes a source for creating a laser beam 104 which is activated by a control button 106. The laser beam 104 can be used to highlight an object, and is therefore useful as a laser pointer.

In a specific embodiment of the input device 100, the laser beam 104 is directed at a bar code 108 and reflected light 110 enters a bar code scanner 112. The input device 100 includes a programmable processor (not shown). In a specific embodiment, the processor is part of the pointing device (36 of FIG. 3). The processor receives input signals from the pointing device and the control buttons and formats the inputs to create an industry standard coded output signal (FIG. 5). The processor also receives an input signal from the bar code scanner 112. In a specific embodiment, the processor formats the received bar code scanner signal to form an additional coded output signal which is multiplexed with the industry standard pointing device/control button output signal.

While the invention has been described in relation to the embodiments shown in the accompanying Drawing figures, other embodiments, alternatives and modifications will be apparent to those skilled in the art. It is intended that the Specification be exemplary only, and that the true scope and spirit of the invention be indicated by the following Claims.

What is claimed is:

1. A computer input device, comprising:
    a sheath having a body and defining a receiving space for a microphone;
    a pointing device integrally disposed on the body;
    at least one pointing device control button integrally disposed on the body;
    a cable for connecting a received microphone, the pointing device, and the at least one control button to a computer system.

2. The computer input device as set forth in claim 1, wherein the receiving space accommodates a hand-held microphone having a connector at an end inserted into the receiving space, a microphone element at the opposite end, and a microphone activating switch along one side.

3. The computer input device as set forth in claim 2, wherein the receiving space further accommodates a microphone having a narrower portion between its two ends, the microphone element end being larger and the connector end being approximately the same diameter as the middle narrower portion, and wherein the narrower portion, including the connector end, is inserted into an open end of the receiving space until the microphone connector mates with a compatible connector which is located within the receiving space.

4. The computer input device as set forth in claim 1, wherein the sheath adds but a small amount to the thickness of the narrower portion so that the sheathed microphone is a comfortable fit to the hand of a user familiar with the feel of the microphone, the sheath being thicker nearer its open end for housing the pointing device and the control buttons.

5. The computer input device as set forth in claim 1, wherein a compatible microphone includes a side-mounted slide button for operating an internal on/off switch, and wherein the sheath has an opening which exposes the slide button, permitting a user to operate the on/off switch.

6. The computer input device as set forth in claim 1, wherein a compatible microphone includes a side-mounted slide button for operating an internal magnetic on/off switch, and wherein the sheath includes an external button which operates a magnet within the sheath adjacent to the microphone magnetic switch for operating the switch without using the microphone slide button, permitting a user to operate the microphone on/off switch.

7. The computer input device as set forth in claim 1, wherein the control buttons and the pointing device provide an industry standard, coded output signal.

8. The computer input device as set forth in claim 7, wherein the industry standard, coded output signal is compatible with the IBM PS/2 standard.

9. The computer input device as set forth in claim 7, wherein the pointing device includes a programmable processor for accepting inputs from the control buttons and the pointing device and for providing the industry standard coded output signal.

10. The computer input device as set forth in claim 9, further including a laser beam source which can be activated by a control button for pointing at objects.

11. The computer input device as set forth in claim 10, further including a bar code scanner which is activated by a control button and which uses the laser beam source as a light source for scanning a bar code, whereby a user swipes the input device along a bar code for scanning the code.

12. The computer input device as set forth in claim 11, wherein the programmable processor receives an input from the bar code scanner, converts the input to a coded output signal, and multiplexes the coded output signal with the industry standard pointer/control button output signal.

13. The computer input device as set forth in claim 1, wherein the pointing device is an isometric pointing device.

14. The computer input device as set forth in claim 13, wherein the isometric pointing device is an IBM TrackPoint pointing device.

15. The computer input device as set forth in claim 1, wherein the pointing device includes a pointing stick which extends through an opening in an outer covering of the computer input device, and the control buttons extend through openings in the outer covering.

16. The computer input device as set forth in claim 15, wherein the pointing stick, the control buttons and the microphone switch define controls and are located on the computer input device to facilitate operation of the controls using one hand which also holds the computer input device for speaking into the microphone.

17. The computer input device as set forth in claim 16, wherein the pointing stick and the at least one control button are located within a larger diameter portion of the computer input device near the opening to the receiving space for the microphone, permitting an extended portion of the computer input device to have a smaller diameter for ease and comfort in holding by one hand.

18. The computer input device as set forth in claim 16, wherein the control buttons are located for operation by two fingers and the pointing stick by the opposed thumb of the one hand holding the computer input device.

19. The computer input device as set forth in claim 18, further including an outer surface being contoured for a comfortable fit while holding the device with one hand for operation and speaking.

20. A computer dictation device, comprising:

an outer cover for holding the device comfortably in one hand while dictating;

the outer cover defining an elongated, cylindrical object having an opening at one end and further defining a receiving space for a hand-held microphone;

the receiving space having an electrical connector at an end opposite the opening, the connector compatibly mating with a connector at one end of the hand-held microphone for making electrical connection with the microphone and microphone switch signals;

the outer cover forming a handle for the computer dictation device having a diameter just large enough to accommodate the microphone within the elongated receiving space;

a portion of the outer cover located near the opening having a larger diameter and enclosing an isometric computer pointing device and at least one pointing device control button;

an electrical cable attached to the dictation device at the end nearest the electrical connector and having a pair of electrical connectors attached to an opposite end of the cable for connection to a computer; and wires within the cable being electrically attached to the electrical connector for connecting the microphone to the computer, and other wires in the cable being electrically attached to the isometric pointing device and the at least one control button for electrically connecting those elements to the computer.

21. The computer dictation device as set forth in claim 20, further including the outer cover being contoured, sized and textured for maximum comfort and ease of use by a person holding the dictation device in one hand.

22. The computer dictation device as set forth in claim 20, wherein the isometric pointing device is an IBM TrackPoint pointing device.

23. The computer dictation device as set forth in claim 20, wherein the isometric pointing device and the at least one control button provide output signals compatible with the IBM PS/2 standard.

24. A computer dictation and pointing device, comprising:

an electrical cable having two ends and being split at one end into two cables, each of the split cables having an electrical connector attached, one connector being compatible with a PS/2 computer input receptacle, and the other connector being compatible with a computer microphone receptacle;

the other end of the PS/2 portion of the electrical cable being attached to an isometric pointing device;

the other end of the microphone portion of the electrical cable being attached to a third electrical connector;

at least one control button being attached to the isometric pointing device;

a housing enclosing the third electrical connector, the pointing device and the at least one control button;

the housing defining an elongated cylinder having an opening at one end through which the electrical cable passes;

the housing also defining a hollow interior which is open at the end of the cylinder opposite the cable opening end;

the third electrical connector being mounted inside the hollow interior at the end adjacent the cable opening;

the opening to the hollow interior, the hollow interior and the mounted third electrical connector defining a receiving space for a hand-held microphone and microphone switch, whereby, a compatible hand-held microphone is inserted into the receiving space through the open end and the microphone connector is mated with the third electrical connector, the cable connecting the microphone and a microphone mounted switch to the computer microphone receptacle, and connecting the pointing device and the at least one control button to the PS/2 receptacle, permitting a user to hold a dictation microphone, a pointing device and at least one control button in one hand for use with an appropriate computer dictation system.

\* \* \* \* \*